Feb. 21, 1933.  W. W. KEMP ET AL  1,898,778
AIR AND GAS MIXING APPARATUS
Filed April 23, 1930
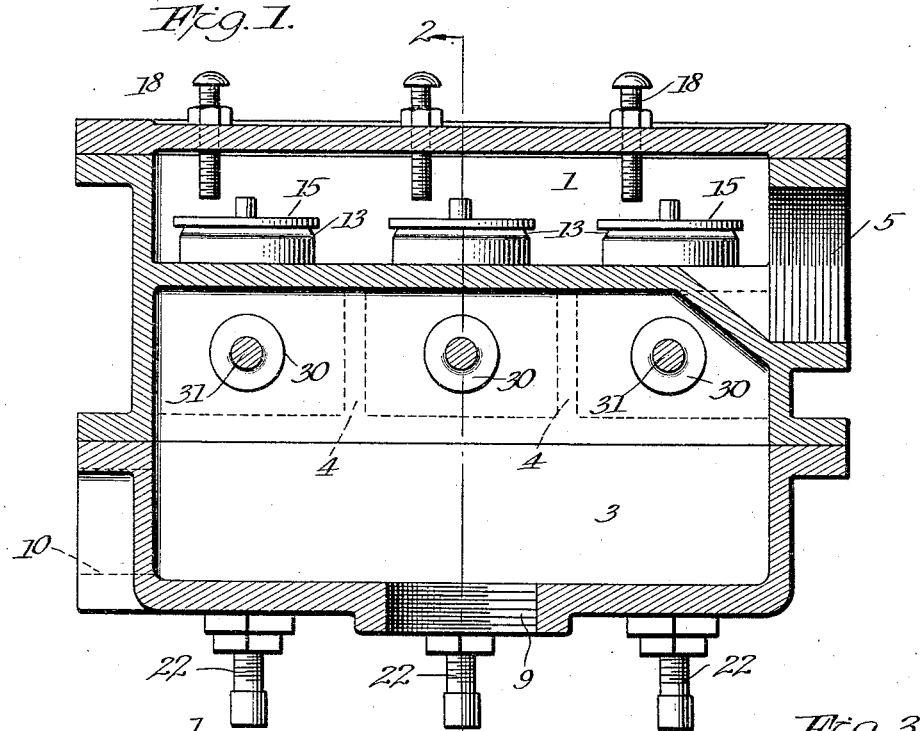
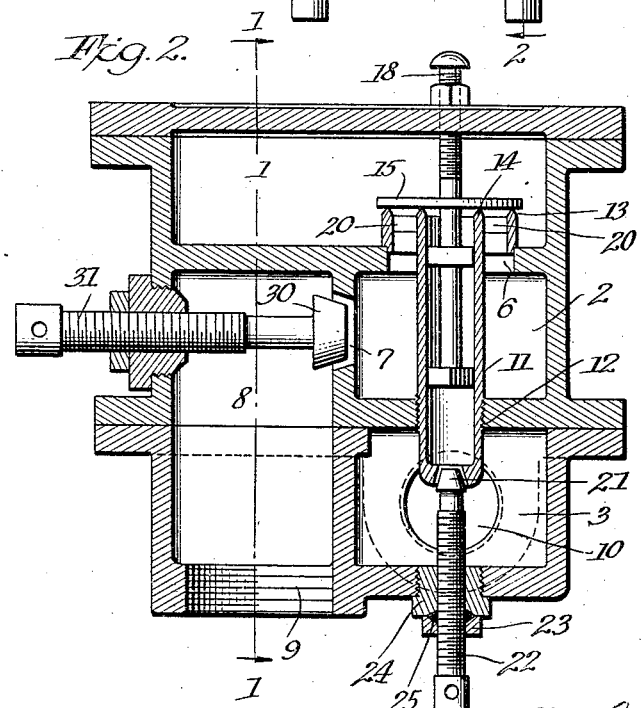
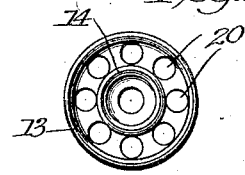
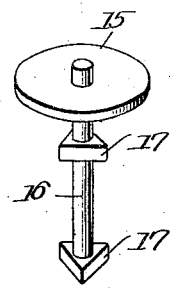
Inventors
William W. Kemp,
William H. Van Horn.
By Cushman, Bryant & Darby
Attorneys Patented Feb. 21, 1933

1,898,778

UNITED STATES PATENT OFFICE

WILLIAM WALLACE KEMP AND WILLIAM H. VAN HORN, OF BALTIMORE, MARYLAND, ASSIGNORS TO THE C. M. KEMP MANUFACTURING COMPANY, OF BALTIMORE, MARYLAND, A CORPORATION OF MARYLAND

AIR AND GAS MIXING APPARATUS

Application filed April 23, 1930. Serial No. 446,690.

The present invention relates to improvements in air and gas mixing apparatus, and, among other objects, provides a very simple and inexpensive means by which air and suitable gas, for example, ordinary illuminating gas, may be suitably mixed to provide a satisfactory combustible mixture for industrial purposes.

Apparatus embodying the invention includes a minimum number of parts, so that an installation including the same is inexpensive and does not require frequent adjustment or care in operation.

In the accompanying drawing some of the parts are shown more or less conventionally, and there can, of course, be considerable departure from the exact details shown. Except where specifically referred to in the appended claims, the latter are to be understood as not limited to the exact arrangement shown, and the drawing is to be considered illustrative, rather than restrictive of the invention.

In the drawing:

Figure 1 is a vertical sectional view through an apparatus constructed in accordance with the invention, substantially on the line 1—1 of Figure 2.

Figure 2 is a section at right angles to Figure 1, being substantially on the line 2—2 on Figure 1.

Figure 3 is a detail plan.

Figure 4 is a perspective view of one of the mixture valves detached.

Referring to the drawing, in the several views of which corresponding parts are designated by the same reference character, the embodiment of the invention illustrated comprises a casing made up of suitable metal castings and interiorly divided to provide a mixing chamber 1, an air chamber 2, and a gas supply chamber 3.

In the embodiment of the invention illustrated, these several chambers are arranged in practically superposed relation, and the intermediate air chamber 2 is divided into a plurality of compartments by suitable partitions 4. The mixture chamber 1 has a mixture outlet 5 adapted to be connected to a suitable conduit, not shown, which, in turn, is connected with suitable burners and in the bottom of such chamber are formed a plurality of ports 6, which severally communicate with the compartments of the air chamber 2.

Each compartment of the air chamber 2 has an air inlet 7, and in the embodiment of the invention illustrated, all of these air inlets are in communication with a chamber 8 having an interiorly threaded aperture 9 with which can be connected a suitable air supply conduit.

The gas chamber 3 is provided at one end with an inlet 10, which is shown as being formed in a suitable boss on the lower casting of the apparatus casing.

Within each of the ports 6, formed, as shown, in the bottom of the mixing chamber 1, is positioned a tubular member comprising an elongated body 11, which is shown as extending vertically through the intermediate chamber 2 of the apparatus, being secured in the bottom thereof by a suitable thread 12, said tubular member thereby connecting the lowest chamber 3 with the upper, mixing, chamber 1.

Preferably, as shown, the tubular member is provided with an enlarged head that is fitted closely to the port 6 and provides at its upper end an annular valve seat or edge 13, which is concentric with a similar seat or edge 14 at the extreme upper end of the main tubular body 11.

The edges 13, 14, constitute two concentric seats for a valve head 15, the stem 16 of which extends into the tubular body 11, and is provided with suitable guiding projections 17 cooperating with the wall of the tubular member to guide the valve in its vertical movement and prevent it from becoming disengaged from the tubular member.

Upward movement of each of the valves 15 is limited by a suitable adjustable stop 18.

The tubular member 11 and the outer portion of the enlarged head thereof are shown as connected by a web, in which are formed a series of relatively small apertures 20, so that the air passing to the mixing chamber through each port 6 is broken up into a plurality of small streams which surround the stream of gas delivered to the mixing chamber through the upper end of the tubular member 11.

Cooperating with the open end of each tubular member is a plug valve 21, the threaded stem 22 of which extends through the bottom of the gas chamber so that it can be readily turned to vary the effective area of the opening at the bottom of the tubular member, the valve being secured in position by a suitable lock nut 23. As shown, the valve stem 22 is preferably mounted in a bushing 24, and a packing 25 is provided to prevent escape of gas from the chamber 3.

The effective area of each air inlet port 7 may be readily controlled by a valve 30, the threaded stem 31 of which extends through a side wall of the casing of the apparatus so that it may be readily rotated to move the valve 30 into or from its coacting port 7.

The valves 15 are of different weights, so that, except when a maximum amount of mixture is being delivered, all of the valves will not be raised from their respective seats.

It will be understood that in using the apparatus the passage of gas and air through the apparatus may be produced by suction operating through the mixture outlet 5, a suitable fan being arranged, for example, intermediate the apparatus and the burners, or the air and gas may be delivered to the apparatus under pressure.

It is believed that the operation and advantages of the improvements will be readily understood from the foregoing description and the drawing. When any of the burners connected with the apparatus are opened, the circulation of air and gas through the apparatus will raise one or more of the valves 15 from its seats and the mixture produced in the chamber 1 will pass through the outlet 5 to the burner or burners. If the rate of consumption of the mixture is increased, as by opening additional burners, the amount of mixture supplied will be augmented by others of the valves lifting from their seats, and if any of the burners are closed, the heavier valves will, by gravity, fall to a position so that each will close the upper end of its associated tubular member 11, and also the port 6 in the bottom of the mixing chamber in which said tubular member is positioned.

The apparatus, it will be noted, involves no mechanical means for moving the valves, and a minimum number of parts. The maximum extent of opening of any valve is limited by its cooperating stop 18, and the proportion of air and gas supplied to the mixing chamber at any time can be controlled by proper adjustment of the valves 21, 30.

By removing the top of the casing, access is readily had to the valves 15, and the latter can be withdrawn from the apparatus and replaced or the tubular members, if necessary, can be similarly removed and replaced. All of the parts are easily accessible, and the entire apparatus will require but a minimum amount of attention when in operation.

We claim:

1. In an air and gas mixing apparatus, the combination of three superposed chambers, the upper, mixing, chamber having a mixture outlet and the other chambers having, respectively, gas and air inlets, a port being provided in the bottom of the mixing chamber and connecting said chamber with the next lower chamber, a tubular member extending through the intermediate chamber, in coaxial relation with the last said port, into the lowest chamber, and a valve adapted to close both the last said port and the upper end of said tubular member.

2. In an air and gas mixing apparatus, the combination of three superposed chambers, the upper, mixing, chamber having a mixture outlet and the other chambers having, respectively, gas and air inlets, a port being provided in the bottom of the mixing chamber and connecting said chamber with the next lower chamber, a tubular member extending through the last said port and the intermediate chamber into the lowest chamber, and a valve adapted to close the end of said tubular member within the mixing chamber and the surrounding port connecting that chamber with the intermediate chamber.

3. In an air and gas mixing apparatus, the combination of three superposed chambers, the upper, mixing, chamber having a mixture outlet and the other chambers having, respectively, air and gas inlets, a plurality of ports being provided in the bottom of the mixing chamber and connecting said chamber with the next lower chamber, a tubular member extending through each of said ports in the bottom of the mixing chamber and communicating with the lowest chamber, and a plurality of valves within the mixing chamber each adapted to close the end of one of the tubular members and the surrounding port in the bottom of the mixing chamber, the several valves being of different weights, for the purpose described.

4. In an air and gas mixing appartus, the combination of three superposed chambers, the upper, mixing, chamber having a mixture outlet and the other chambers having, respectively, gas and air inlets, a port being provided in the bottom of the mixing chamber and connecting said chamber with the next lower chamber, a tubular member extending through the last said port and having at its upper end an enlarged, apertured, head provided on its upper face with two concentric valve seats, said member connecting the lowest chamber with the mixing chamber, and a valve within the mixing chamber adapted to cooperate with both said valve seats, for the purpose described.

5. In an air and gas mixing apparatus, the combination of three superposed chambers, the upper, mixing, chamber having a mixture outlet and the other chambers having, respectively, air and gas inlets, a port being provided in the bottom of the mixing chamber and connecting said chamber with the next lower chamber, a valve seat within the mixing chamber about the last said port, a tubular member extending through the last said port and the intermediate chamber into communication with the lowest chamber, and a valve within the mixing chamber adapted to cooperate with both said valve seat and the upper end of the tubular member to control the admission of both air and gas to the mixing chamber.

6. In an air and gas mixing apparatus, the combination of three superposed chambers, the upper, mixing, chamber having a mixture outlet and the other chambers having, respectively, gas and air inlets, a port being provided in the bottom of the mixing chamber and connecting said chamber with the next lower chamber, a valve seat within the mixing chamber about the last said port, a tubular member extending through the last said port and into communication with the lowest chamber, and a valve having an enlarged head within the mixing chamber, adapted to cooperate with both said valve seat and the upper end of the tubular member to control admission of both air and gas to the mixing chamber, and a depending stem extending into said tubular member.

7. In an air and gas mixing apparatus, the combination of three superposed chambers, the upper, mixing, chamber having a mixture outlet and the other chambers having, respectively, gas and air inlets, a port being provided in the bottom of the mixing chamber and connecting said chamber with the next lower chamber, a valve seat within the mixing chamber about the last said port, a tubular member extending through the last said port and into communication with the lowest chamber, a valve having an enlarged head within the mixing chamber, adapted to cooperate with both said valve seat and the upper end of the tubular member to control admission of both air and gas to the mixing chamber, and a depending stem that extends into the said tubular member, and an adjustable stop within the mixing chamber for limiting movement of the valve from said seat.

8. In an air and gas mixing apparatus, the combination of three superposed chambers, the upper, mixing, chamber having a mixture outlet and the other chambers having, respectively, air and gas inlets, a port being provided in the bottom of the mixing chamber and connecting said chamber with the next lower chamber, a valve seat within the mixing chamber about the last said port, a tubular member extending through the last said port and into communication with the lowest chamber, and a valve having a head, adapted to cooperate with both said valve seat and the upper end of the tubular member to control admission of both air and gas to the mixing chamber, and a depending stem that extends into the said tubular member, and is provided within said member with lateral projections for guiding movement of the valve.

9. In an air and gas mixing apparatus, the combination of three superposed chambers, the upper, mixing, chamber having a mixture outlet and the other chambers having, respectively, gas and air inlets, a port being provided in the bottom of the mixing chamber and connecting said chamber with the next lower chamber, a tubular member extending through the last said port and the intermediate chamber into the lowest chamber, a valve adapted to close both the last said port and the end of said tubular member within the mixing chamber, and an adjustable valve cooperating with the opening at the lower end of the said tubular member.

10. In an air and gas mixing apparatus, the combination of three superposed chambers, the upper, mixing. chamber having a mixture outlet and the other chambers having, respectively, gas and air inlets, a port being provided in the bottom of the mixing chamber and connecting said chamber with the next lower chamber, a tubular member extending through the partition separating the intermediate and lowest chambers with its upper end in alignment with the last said port, a valve adapted to close both the upper end of said tubular member and the said port in the bottom of the mixing chamber, and means for limiting upward movement of said valve.

11. In an air and gas mixing apparatus, the combination of a mixing chamber having a mixture outlet and provided in its bottom with a plurality of ports, an air chamber arranged beneath the mixing chamber and interiorly divided into compartments each communicating with one of the ports in the bottom of the mixing chamber, each compartment of the air chamber having an independent air inlet port, a gas chamber, a plurality of tubular members each connecting the gas chamber with one of the ports in the bottom of the mixing chamber, a plurality of valves in the mixing chamber each adapted to close the end of one of said ports in the bottom of the mixing chamber and the end of the corresponding tubular member, said valves being of different weights, adjustable means controlling the admission of air to each compartment of the air chamber, and independently adjustable means for controlling admission of gas to each of the tubular members.

12. Air and gas mixing apparatus comprising a casing having a plurality of chambers each provided with an independent fluid supply passage and an independent port to deliver the fluids to be mixed to another chamber, said independent delivery ports being concentrically disposed one within the other, a casing leading to the central port of the series, a gravity single valve controlling delivery from the independent delivery ports, and a valve stem reciprocable in the casing leading to the central port to guide said valve.

13. In an air and gas mixing apparatus, the combination of a mixing chamber provided with inlet ports, a plurality of chambers communicating with the mixing chamber through the inlet ports of the latter, each of the last named chambers having an inlet port, a manifold to supply fluid to the last named chambers through the inlet ports thereof, a second manifold having a plurality of tubular members each extending therefrom and into one of the mixing chamber inlet ports, and a plurality of valves in said mixing chamber, each valve being adapted to seat against one of the inlet ports thereof and the respective tubular members.

14. In an air and gas mixing apparatus, the combination of a mixing chamber provided with inlet ports, a plurality of chambers communicating with the mixing chamber through the inlet ports of the latter, each of the last named chambers having an inlet port, a manifold to supply fluid to the last named chambers through the inlet ports thereof, a second manifold having a plurality of tubular members each extending therefrom and into one of the mixing chamber inlet ports, and a plurality of gravity actuated valves in said mixing chamber, each valve being adapted to seat against one of the inlet ports thereof and the respective tubular members.

In testimony whereof we have hereunto set our hands.

WILLIAM WALLACE KEMP.
WILLIAM H. VAN HORN.